United States Patent
Zhang et al.

(10) Patent No.: US 11,613,048 B2
(45) Date of Patent: Mar. 28, 2023

(54) DEVICE AND METHOD FOR PREPARATION OF A COMPOSITE FOR ON-SITE PIPELINE REINFORCEMENT

(71) Applicant: SICHUAN DEYUAN PETROLEUM & GAS CO., LTD., Sichuan (CN)

(72) Inventors: Yong Zhang, Sichuan (CN); Yu Zhang, Sichuan (CN); Jianfeng Lu, Sichuan (CN); Jian Lei, Sichuan (CN); Qiang Peng, Sichuan (CN)

(73) Assignee: SICHUAN DEYUAN PETROLEUM & GAS CO., LTD., Sichuan (CN)

(*) Notice: Subject to any disclaimer, the term of this patent is extended or adjusted under 35 U.S.C. 154(b) by 80 days.

(21) Appl. No.: 17/489,416

(22) Filed: Sep. 29, 2021

(65) Prior Publication Data
US 2022/0016806 A1   Jan. 20, 2022

Related U.S. Application Data

(62) Division of application No. 16/097,320, filed as application No. PCT/CN2016/095920 on Aug. 18, 2016, now Pat. No. 11,179,867.

(30) Foreign Application Priority Data

Jun. 14, 2016 (CN) .......................... 201610421518.1

(51) Int. Cl.
*B29C 70/44* (2006.01)
*B29B 15/12* (2006.01)
(Continued)

(52) U.S. Cl.
CPC ............ *B29B 15/122* (2013.01); *B29C 70/48* (2013.01); *F16L 55/1683* (2013.01); *F16L 55/1686* (2013.01); *F16L 55/18* (2013.01); *B29C 63/0021* (2013.01); *B29C 63/0073* (2013.01); *B29C 63/06* (2013.01); *B29K 2105/089* (2013.01); *B29L 2023/22* (2013.01)

(58) Field of Classification Search
CPC ........................... B29C 70/443; B29C 70/446
See application file for complete search history.

(56) References Cited

FOREIGN PATENT DOCUMENTS

CN           203818590      *    9/2014

OTHER PUBLICATIONS

English translation of CN203818590 (Year: 2014).*

* cited by examiner

*Primary Examiner* — Scott W Dodds
(74) *Attorney, Agent, or Firm* — Hodgson Russ LLP

(57) ABSTRACT

A device for preparation of composite for on-site pipeline reinforcement includes: a temperature control stirring unit, an infiltration unit, and a vacuum unit communicated in sequence, the infiltration unit includes a spindle, reinforced fiber cloth, a flow-guiding net, and a vacuum bag film sleeved outside them, the spindle is stopped by two baffles, an adhesive feeding joint and an adhesive discharging joint are disposed at two ends of the spindle, respectively, the adhesive feeding joint and the adhesive discharging joint each includes an inner joint and an outer joint, sealing discs disposed at a junction between the inner joint and the outer joint, an outer wall of the inner joint and an outer side of the baffle are covered by a flow-leading net, and the flow-guiding net covered on the outer side of the baffle extends from an edge of the baffle into the adhesive storing compartment of the baffle.

13 Claims, 2 Drawing Sheets

(51) Int. Cl.
B29C 70/48 (2006.01)
F16L 55/168 (2006.01)
F16L 55/18 (2006.01)
B29C 63/00 (2006.01)
B29K 105/08 (2006.01)
B29C 63/06 (2006.01)
B29L 23/00 (2006.01)

DEVICE AND METHOD FOR PREPARATION OF A COMPOSITE FOR ON-SITE PIPELINE REINFORCEMENT

CROSS-REFERENCE TO RELATED APPLICATIONS

This application is a divisional application of U.S. application Ser. No. 16/097,320, which is based on and claims priority to International Application No. PCT/CN2016/095920, filed on Aug. 18, 2016 and Chinese Patent Application No. 201610421518.1, filed on Jun. 14, 2016, the entire contents of which are incorporated by reference herein.

FIELD

The present disclosure relates to the field of defect repair of petroleum and natural gas pipelines, and more particularly to a device for preparation of a composite for on-site pipeline reinforcement.

BACKGROUND

Fiber reinforced composites have been widely used in various fields because of their small specific gravity, high specific strength and high specific modulus. At present, commonly used preparation methods of the fiber reinforced composites include: a wet wrap process, a resin transfer molding, a vacuum infusion process, and a pultrusion process. The composites are also being gradually applied to the field of defect repair of petroleum and natural gas pipelines. Even the resin transfer molding and the vacuum infusion process can ensure the infiltration of reinforced fibers with resins, while maximizing a proportion of the reinforced fibers at the same time, and give an end product produced thereby an excellent performance, a special equipment is needed, and a mold needs to be made, which lead the on-site repair of petroleum and natural gas pipelines inefficient. Moreover, as there are many condition limitations on site, it is difficult to apply the resin transfer molding and the vacuum infusion process.

At present, preparation methods that may be applied to the on-site defect repair of the petroleum and natural gas pipelines mainly include a full cure process (i.e., the pultrusion process) and the wet wrap process. The full cure process is such a process that a composite sleeve is pre-produced in a plant according to a diameter of a pipeline via the pultrusion process, and then is wound onto a defect region of the pipeline to repair the defect. The composite sleeve has a stable performance as it is pre-produced in the plant. However, as the composite sleeve has a high hardness itself, it is difficult to guarantee that the composite sleeve is fully attached to the pipeline when applied to the pipeline, and it is prone to form a hollow, especially at a weld or a deformed region of the pipeline, which will cause significant reduction in repair effect, and even cause failure of the repair. The wet wrap process is such a process that a dried reinforced fiber is wound and the resin is coated at the same time onto the defect of the pipeline so as to install the composite for repair on site. This process will be greatly affected by uncontrollable factors from human or environment, such as, high viscosity of the resin at low temperature, inadequate or un-uniform infiltration of fiber cloth, environmental humidity, wind, sand and other factors, all of which will cause loss of the performance of the composite and thereby affect the repair effect.

SUMMARY

Seeking to solve the above problems, embodiments of the present disclosure provide a device and method for preparation of a composite for on-site pipeline reinforcement, which achieves the infiltration of a multilayer roll by the vacuum infusion process without using a mold, can be implemented on site at a low temperature, allow to use a resin having a high viscosity as a resin for infiltrating, has characteristics of high infiltration efficiency and short installation time, and give an end product with good mechanical properties.

For achieving the above purposes, embodiments of the present disclosure provide a device for preparation of a composite for on-site pipeline reinforcement, including: a temperature control stirring unit, an infiltration unit, and a vacuum unit. The temperature control stirring unit, the infiltration unit and the vacuum unit are communicated in sequence. The infiltration unit comprises a spindle, reinforced fiber cloth, a flow-guiding net, and a vacuum bag film sleeved outside the spindle, the reinforced fiber cloth and the flow-guiding net. The spindle is stopped by two baffles, the reinforced fiber cloth and the flow-guiding net are arranged between the two baffles, and the baffle is recessed at an inner side thereof to form an adhesive storing compartment. The adhesive storing compartment defines a plurality of through-holes for feeding or discharging an adhesive. An adhesive feeding joint and an adhesive discharging joint are disposed at two ends of the spindle, respectively, and each of the adhesive feeding joint and the adhesive discharging joint comprises an inner joint and an outer joint, sealing discs disposed at a junction between the inner joint and the outer joint. The inner joint is threadedly connected with the outer joint, the inner joint defines a plurality of openings for feeding or discharging the adhesive. An outer wall of the inner joint and an outer side of the baffle are covered by a flow-leading net, and the flow-leading net covered on the outer side of the baffle extends from an edge of the baffle into the adhesive storing compartment of the baffle.

Alternatively, the reinforced fiber cloth and the flow-guiding net are layered and alternately wound on the spindle.

Alternatively, sealing discs are disposed at a junction between the inner joint and the outer joint, and an O-ring is disposed between the sealing discs, two ends of the vacuum bag film are located in the sealing discs of the adhesive feeding joint and the sealing discs of the adhesive discharging joint, respectively, and are tightened and sealed via threaded structures of the inner joint and the outer joint.

Alternatively, one or more annular grooves are defined in the sealing disc and fitted with the O-ring.

Alternatively, the two baffles are detachably connected with the spindle, and a distance between the two baffles is adjustable.

Alternatively, the temperature control stirring unit includes a barrel, a cover plate, a stirrer fixed to the cover plate, and a temperature control heating belt wrapped on the barrel, two ends of the temperature control heating belt are connected via a snap, the barrel is provided with an adhesive sucking pipe, a first end of the adhesive sucking pipe extends to a bottom of the barrel, and a second end of the adhesive sucking pipe is connected with the outer joint of the adhesive feeding joint.

Alternatively, the vacuum unit includes a vacuum pump and a buffer tank, the buffer tank is communicated with the vacuum pump through a connecting pipe and provided with a vacuum gauge and an adhesive discharging pipe, an adhesive storage tank is disposed in the buffer tank, the adhesive discharging pipe is provided with a control valve, a first end of the adhesive discharging pipe is located in the adhesive storage tank, and a second end of the adhesive discharging pipe is communicated with the outer joint of the adhesive discharging joint.

Alternatively, the reinforced fiber cloth is selected from a group of glass fiber cloth, carbon fiber cloth, aramid fiber cloth, basalt fiber cloth, boron fiber, polyester fiber, nylon fiber, polypropylene fiber, and polyimide fiber.

Alternatively, the flow-guiding net has a surface density in a range of 60 g/m$^2$ to 400 g/m$^2$ and rhombic meshes.

Alternatively, the vacuum bag film has a water vapor transmission of less than or equal to 0.006 g/m·24 h (40° C.·90% RH).

Alternatively, the vacuum bag film has an oxygen permeability of less than or equal to 0.024 ml/(m·24 h.·0.1 mPa).

Alternatively, the vacuum bag film has a binding strength of greater than 15 N/15 mm.

Alternatively, the vacuum bag film has an edge strength of greater than 20 N/15 mm, and a puncture strength of greater than 24 pounds.

DETAILED DESCRIPTION

Figure 1:
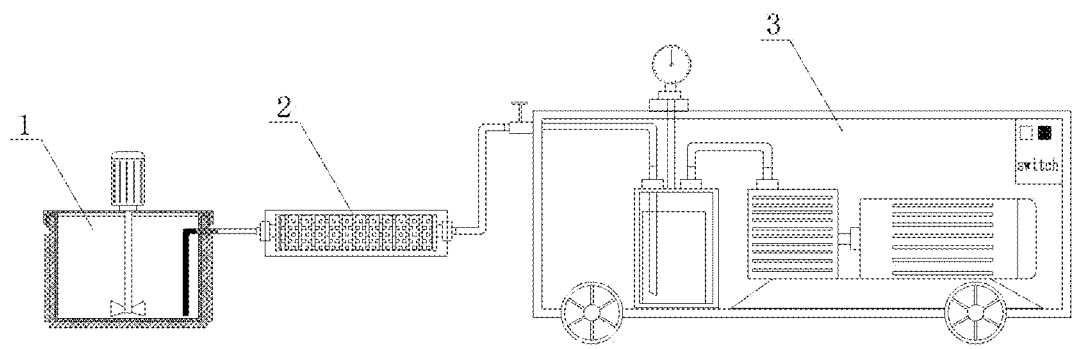
FIG. 1 is a schematic diagram of a device for preparation of a composite for on-site pipeline reinforcement according to an embodiment of the present disclosure.

Embodiments of the present disclosure provide a device for preparation of a composite for on-site pipeline reinforcement, including: a temperature control stirring unit, an infiltration unit, and a vacuum unit. The temperature control stirring unit, the infiltration unit and the vacuum unit are communicated in sequence. The infiltration unit comprises a spindle, reinforced fiber cloth, a flow-guiding net, and a vacuum bag film sleeved outside the spindle, the reinforced fiber cloth and the flow-guiding net. The spindle is stopped by two baffles, the reinforced fiber cloth and the flow-guiding net are arranged between the two baffles, and the baffle is recessed at an inner side thereof to form an adhesive storing compartment. The adhesive storing compartment defines a plurality of through-holes for feeding or discharging an adhesive. An adhesive feeding joint and an adhesive discharging joint are disposed at two ends of the spindle, respectively, and each of the adhesive feeding joint and the adhesive discharging joint comprises an inner joint and an outer joint, sealing discs disposed at a junction between the inner joint and the outer joint. The inner joint is threadedly connected with the outer joint, the inner joint defines a plurality of openings for feeding or discharging the adhesive. An outer wall of the inner joint and an outer side of the baffle are covered by a flow-leading net, and the flow-guiding net covered on the outer side of the baffle extends from an edge of the baffle into the adhesive storing compartment of the baffle.

Embodiments of the present disclosure provide a method for preparation of a composite for on-site pipeline reinforcement, including:

a. performing apparatus inspection, and connecting a temperature control stirring unit, an infiltration unit and a vacuum unit as required;

b. adding a resin for infiltration into the temperature control stirring unit in such an amount that a mass ratio of the resin for infiltration to reinforced fiber cloth is in a range from 50:50 to 30:70, setting a suitable stirring temperature and stirring speed, and a stirring time of greater than or equal to 1 min;

the mass ratio of the resin for infiltration to the reinforced fiber cloth directly determines mechanical properties of an end product; in order to achieve excellent mechanical properties for the fiber reinforced composite, when a viscosity of the resin for infiltration is less than or equal to 2000 cps, the stirring temperature is not less than 20° C. but not greater than 23° C.; when the viscosity of the resin for infiltration is between 2000 cps and 8000 cps, the stirring temperature is greater than 23° C. but is not greater than 35° C.; when the viscosity of the resin for infiltration is not less than 8000 cps but not greater than 20000 cps, the stirring temperature is between 35° C. and 45° C., thereby adjusting the viscosity of the resin via the temperature so as to enable the method of the present disclosure to achieve a suitable infiltration speed; a rotating speed of the stirring unit is greater than or equal to 200 rmp, thereby adequately mixing the resin with a curing agent;

c. activating the vacuum unit to a vacuum degree of greater than or equal to 0.01 MPa to create a negative pressure of at least 0.01 MPa in a reinforced fiber cloth wrap, air in a reinforced fiber cloth roll being sucked out and replaced by the resin which is configured to bind with the reinforced fiber so as to increase integrity of the end product, accurately calculating an amount of a resin adhesive used for the reinforced fiber, based on which a performance of the end product is determined by conversion, and precisely controlling a quality of the end product; the negative pressure of at least 0.01 MPa as defined above drives the air in the reinforced fiber cloth roll out totally, and provides enough power to the resin adhesive for infiltrating into space among the reinforced fibers.

d. continuously running the vacuum unit for more than 1 min after the resin for infiltration is sucked into a buffer tank so as to suck an excess resin adhesive out, and stopping the vacuum unit; this operation is capable of sucking the excess resin adhesive out, preventing the air from flowing back to reinforced fiber cloth roll, and improving the mechanical properties of the fiber reinforced composite;

e. an infiltration process, in which the resin after mixed is fed via an adhesive feeding joint, passes through a flow-leading net, flows into the reinforced fiber cloth roll via a periphery and through-holes of a baffle, and sucked out through an adhesive discharging joint; the flow-guiding net is configure to play a flow-guiding function so as to make the resin infiltrate evenly;

f. disconnecting the infiltration unit from the vacuum unit and the temperature control stirring unit, respectively, and taking out the reinforced fiber cloth roll;

g. wrapping a pipeline with the reinforced fiber cloth roll in a circumferential direction of the pipeline under a uniform tensile force, and performing a defoaming treatment simultaneously until completion of the wrapping; the uniform tensile force improves the attachment of the fiber reinforced composite to the pipeline, and the defoaming treatment eliminates the air among layers of the reinforced fiber to make the composite integrated, thereby making a greater improvement to performances of the end product.

Embodiments of the present disclosure provide a method for preparation of a composite for on-site pipeline reinforcement, comprising:

a. performing apparatus inspection, and connecting a temperature control stirring unit, an infiltration unit and a vacuum unit;

b. adding a resin for infiltration into the temperature control stirring unit in such an amount that a mass ratio of the resin for infiltration to a reinforced fiber cloth is in a range from 50:50 to 30:70, setting a stirring temperature and stirring speed greater than or equal to 200 rpm for the temperature control stirring unit; and when a viscosity of the resin for infiltration is less than or equal to 2000 cps, the stirring temperature is not less than 20° C. but not greater than 23° C.; when the viscosity of the resin for infiltration is between 2000 cps and 8000 cps, the stirring temperature is greater than 23° C. but is not greater than 35° C.; and when the viscosity of the resin for infiltration is not less than 8000 cps but not greater than 20000 cps, the stirring temperature is between 35° C. and 45° C., and stirring the resin for infiltration for greater than or equal to 1 minute;

c. an infiltration process occurring in the infiltration unit, wherein the reinforced fiber cloth is wrapped over the infiltration unit, comprising:

activating the vacuum unit to create a negative pressure of at least 0.01 MPa in the reinforced fiber cloth, air in the reinforced fiber cloth being sucked out and replaced by the resin for infiltration from the temperature control stirring unit, wherein the resin for infiltration is configured to bind with fibers of the reinforced fiber cloth so as to increase integrity of an end product, wherein the reinforced fiber cloth after the infiltration process is a reinforced fiber cloth wrap;

continuously running the vacuum unit for more than 1 minute after the resin for infiltration is sucked into a buffer tank so as to suck an excess resin out, and stopping the vacuum unit;

calculating an amount of the resin for infiltration infiltrated into the fibers of the reinforced fiber cloth wrap by subtracting a known amount of resin not infiltrated, based on an amount of the resin for infiltration sucked out of the infiltration unit and an amount of the resin for infiltration residual in the infiltration unit, from a known amount of the resin supplied to the infiltration unit; determining an amount of the resin for infiltration required for pipeline rehabilitation according to a strength required for pipeline rehabilitation; and determining that the reinforced fiber cloth wrap is unqualified if the amount of the resin for infiltration infiltrated into the fibers does not reach the amount required for pipeline rehabilitation;

wherein after stirring, the resin for infiltration is fed via an adhesive feeding joint, passes through a flow-leading net, flows into the reinforced fiber cloth via a periphery and through-holes of a baffle, and is sucked out through an adhesive discharging joint, wherein the adhesive feeding joint includes an inner joint, an outer joint, and sealing discs disposed at a junction between the inner joint and the outer joint, and an outer wall of the inner joint and an outer side of the baffle are covered by the flow-leading net, wherein the flow-guiding net has a surface density in a range of 60 g/m² to 400 g/m² and rhombic meshes;

d. disconnecting the infiltration unit from the vacuum unit and the temperature control stirring unit, respectively, and taking out the reinforced fiber cloth wrap;

e. wrapping a pipeline with the reinforced fiber cloth wrap in a circumferential direction of the pipeline under a uniform tensile force, and performing a pressing treatment simultaneously to eliminate air among layers of the reinforced fiber cloth wrap until completion of the wrapping to make the reinforced fiber cloth wrap integrated on the pipeline.

Alternatively, in step c, precisely controlling performance and quality of the end product according to the amount of the resin adhesive used for the reinforced fiber includes:

determining, for use of auxiliary materials in the same specification, the amount of the resin adhesive used for the reinforced fiber according to test data, in which an amount of the resin adhesive not infiltrated into the reinforcing fiber mainly includes those stored in an adhesive storing compartment, those residual in an infiltration path and those sucked out, and a weight of the reinforced fiber cloth roll is certain; for example, for a unidirectional glass fiber cloth having a surface density of 400 g/m² and a length of 13.5 m, the baffle having a diameter of 8.3 mm is used, the amount of the resin adhesive not infiltrated into the reinforcing fiber is 0.13 kg, a total mass of the reinforced fiber is 1.6 kg, when a total amount of the resin adhesive is 1.11 kg, a percentage by weight of the resin adhesive contained in the end product (i.e., the amount of the resin adhesive used for the reinforced fiber, or the percentage of the resin adhesive infiltrated into the reinforced fiber) is 38%, and a tensile strength is 989 MPa; when the total amount of the resin adhesive is 1.29 kg, the percentage by weight of the resin adhesive contained in the end product is 42.1%, and the tensile strength is 893 MPa; when the total amount of the resin adhesive is 2.09 kg, the percentage by weight of the resin adhesive contained in the end product is 55.1%, and the tensile strength is 682 MPa;

determining an amount of the resin adhesive required for pipeline rehabilitation by conversion according to a strength designed for the composite and a strength designed for the pipeline rehabilitation; and determining that the end product is unqualified if the amount of the resin adhesive used for the reinforced fiber does not reach the amount of the resin adhesive required for pipeline rehabilitation.

Alternatively, the vacuum bag film is a heat-sealed plastic bag film; and an infiltration package of the reinforced fiber cloth is a prefabricated product and packaged using vacuum package, which can reduce a moisture content of the reinforced fiber, greatly enhance a binding force between the reinforced fiber and the resin, thereby improving performances of the end product of the composite.

Compared with the related art, the present disclosure has the following advantages.

(1) With the temperature control stirring unit, the range of the temperature applied to on-site defect repair of the pipeline can be increased greatly, and operations can be performed at the temperature ranging from −15° C. to 40° C. Furthermore, a constant temperature can be determined for the resin for infiltration according to properties thereof, which improves the infiltration effect and the infiltration efficiency.

(2) The device is provided with sealing structures for the inner joint and the outer joint and flow-leading and flow-guiding structures, which enable the resin having a low viscosity (less than 5000 cps) to infiltrate at an expected speed, thereby improving the infiltration effect. Therefore, the resin having a viscosity in a broader range can be applied to the on-site defect repair of the pipeline, for example, a resin having a viscosity below 20000 cps can be used as the resin for infiltration.

(4) Vacuum infusion of a multilayer roll is achieved without using a mold.

(5) The method of the present disclosure combines advantages of the full cure process, the vacuum infusion process and the wet wrap process of the fiber reinforced composite, the mechanical properties of the end product of the composite prepared thereby are improved by 1.5 times, and an installation efficiency is improved by 2 times.

(6) The present disclosure can be applied to the field of defect repair of petroleum and natural gas pipelines.

In the following, the present disclosure will be further illustrated.

Figure 2:
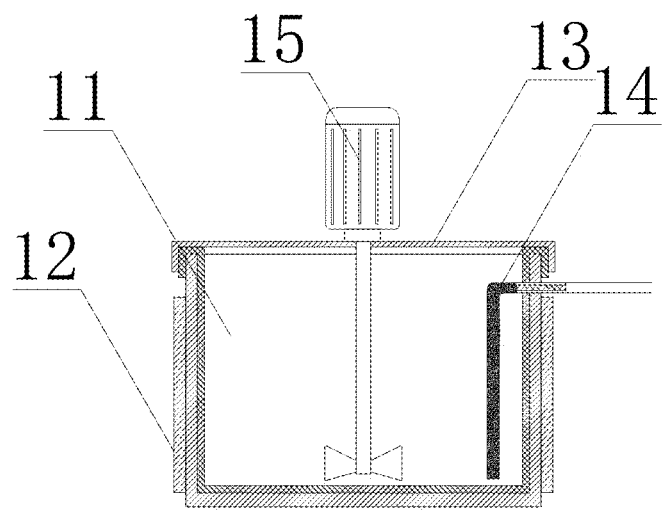
FIG. 2 is a schematic diagram of a temperature control stirring unit according to an embodiment of the present disclosure.
Figure 3:
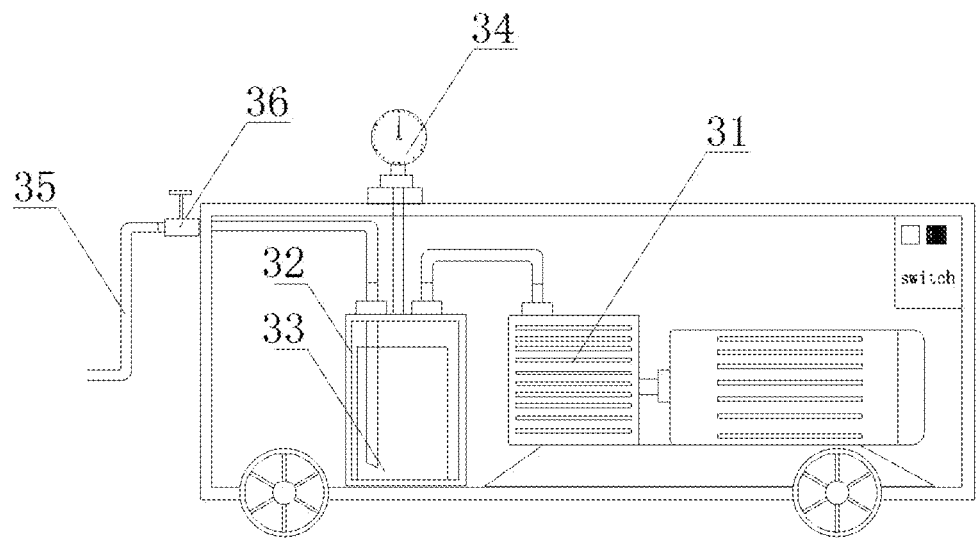
FIG. 3 is a schematic diagram of a vacuum unit according to an embodiment of the present disclosure.
Figure 4:
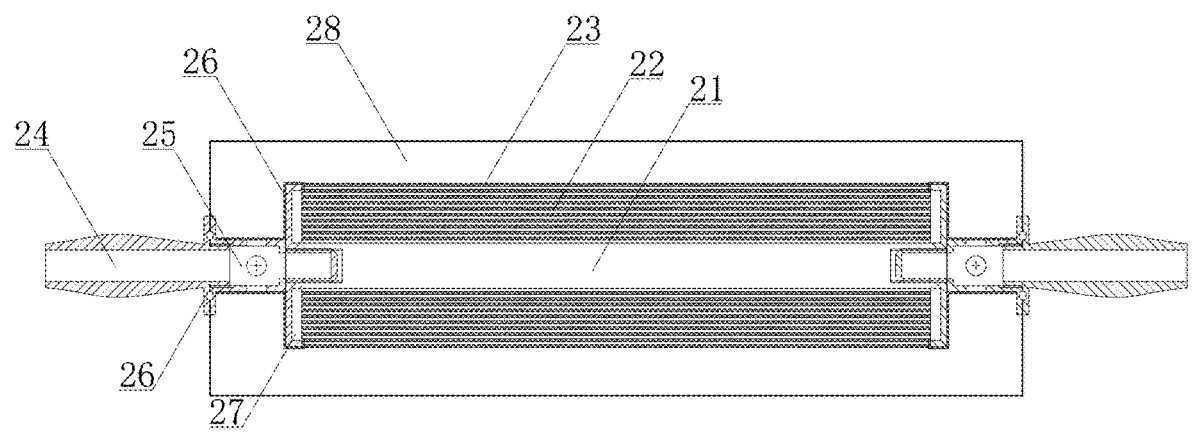
FIG. 4 is a schematic diagram of an infiltration unit according to an embodiment of the present disclosure.
Figure 5:
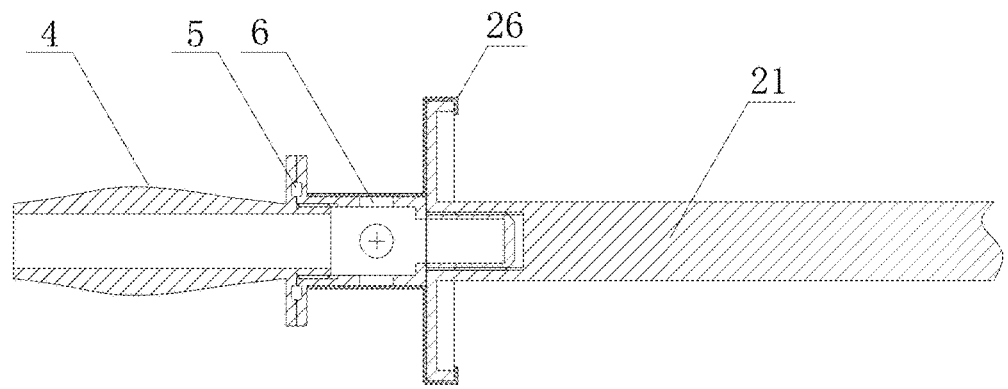
FIG. 5 is a schematic diagram of an adhesive feeding joint and an adhesive discharging joint according to an embodiment of the present disclosure.
Figure 6:
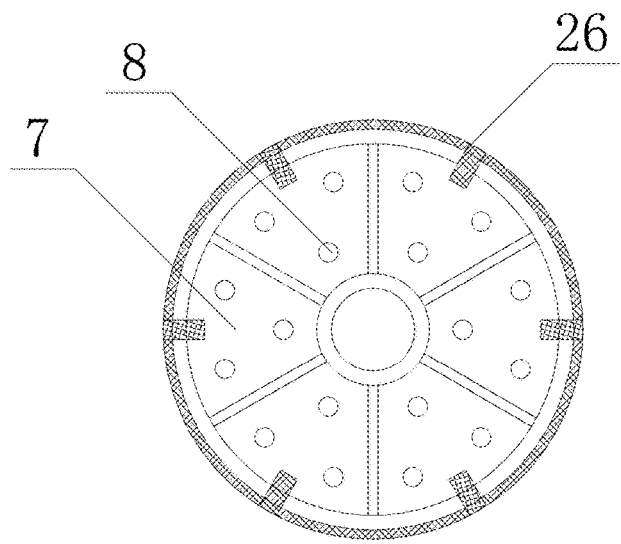
FIG. 6 is a schematic diagram of a baffle according to an embodiment of the present disclosure.

Example 1: referring to FIG. 1 to FIG. 6, a device for preparation of a composite for on-site pipeline reinforcement includes a temperature control stirring unit 1, an infiltration unit 2 and a vacuum unit 3, and the temperature control stirring unit 1, the infiltration unit 2 and the vacuum unit 3 are communicated in sequence. The infiltration unit 2 includes a spindle 21, a vacuum bag film 28, a reinforced fiber cloth 22, and a flow-guiding net 23. The reinforced fiber cloth 22 and the flow-guiding net 23 are layered and alternately wound on the spindle 21. The vacuum bag film 28 is sleeved outside the spindle 21, the reinforced fiber cloth 22 and the flow-guiding net 23, the spindle 21 is stopped by two baffles 27, and the reinforced fiber cloth 22 and the flow-guiding net 23 are arranged between the two baffles 27. The baffle 27 is recessed at an inner side thereof to form an adhesive storing compartment 7, which facilitates to feed adhesive at two ends of the reinforced fiber cloth 22, so as to ensure even infiltration inside the reinforced fiber cloth 22. The adhesive storing compartment 7 defines a plurality of through-holes 8 for feeding or discharging an adhesive. An adhesive feeding joint and an adhesive discharging joint are disposed at two ends of the spindle 21, respectively, each of the adhesive feeding joint and the adhesive discharging joint includes an inner joint 25 and an outer joint 24, and the inner joint 25 is threadedly connected with the outer joint 24. The inner joint 25 defines a plurality of openings 6 for feeding or discharging the adhesive, and an outer wall of the inner joint 25 and an outer side of the baffle 27 are covered by a flow-leading net 26, which plays a flow-leading function for the resin for infiltration. The flow-leading net 26 covered on the outer side of the baffle 27 extends from an edge of the baffle 27 into the adhesive storing compartment 7 of the baffle 27. In the process of vacuumization, the vacuum bag film 28 is prone to be sucked onto the edge of the baffle 27, such that the resin for infiltration cannot be fed from the edge of the baffle 27, thereby resulting in non-uniform infiltration. The design of the flow-leading net 26 effectively solves the problem of feeding adhesive at the edge of the baffle 27, and greatly improves the infiltration effect. The flow-leading net 26 may use the same material as the flow-guiding net 23. The sealing structures for the inner joint 25 and the outer joint 24 and the flow-leading and flow-guiding structures provided by the device enable the resin having a low viscosity (less than 5000 cps) to infiltrate at an expected speed, so as to improve the infiltration effect, which allows the resin having a viscosity in a broader range can be applied to the on-site defect repair of the pipeline, for example, a resin having a viscosity below 20000 cps can be used as the resin for infiltration.

For improving infiltration effect, a ratio of an area of the flow-leading net 26 at the edge of the baffle 27 to an area of the edge of the baffle 27 is in a range of 10% to 70%, and the flow-leading net 26 is evenly distributed along a circumference of the baffle 27. In some embodiments, the viscosity of the resin for infiltration is equal to or less than 1000 cps, and the ratio of the area of the flow-leading net 26 at the edge of the baffle 27 to the area of the edge of the baffle 27 is less than or equal to 10%. In some embodiments, the viscosity of the resin for infiltration is between 1000 cps and 12000 cps, and the ratio of the area of the flow-leading net 26 at the edge of the baffle 27 to the area of the edge of the baffle 27 is between 10% and 45%. In some embodiments, the viscosity of the resin for infiltration is between 12000 cps and 20000 cps, and the ratio of the area of the flow-leading net 26 at the edge of the baffle 27 to the area of the edge of the baffle 27 is greater than or equal to 45%.

Sealing discs are disposed at a junction between the inner joint 25 and the outer joint 24, the design of the sealing discs facilitates to butt the outer joint 24 against the inner joint 25, enlarges the sealing area and improves the sealing effect. An O-ring 5 is disposed between the sealing discs, which plays a good sealing effect. Two ends of the vacuum bag film 28 are located in the sealing discs of the adhesive feeding joint and the sealing discs of the adhesive discharging joint, respectively, and are tightened and sealed via threaded structures of the inner joint 25 and the outer joint 24, which facilitates assembly and disassembly. A first end of the inner joint 25 is connected with the outer joint 24, and a second end of the inner joint 25 is snapped in the spindle 21. One or more annular grooves are defined in the sealing disc and fitted with the O-ring 5, which improves the sealing effect, enhances a sealing performance between the inner joint 25 and the outer joint 24, and also enhances a sealing performance of the vacuum bag film 28.

The two baffles 27 are detachably connected with the spindle 21, and a distance between the two baffles 27 is adjustable according to such as on-site requirements, so as to meet requirements of products in different specifications. The outer joint 24 is provided with a handle 4, which facilitates assembly and disassembly in the on-site operations.

The temperature control stirring unit 1 includes a barrel 11, a cover plate 13, a stirrer fixed to the cover plate 13, and a temperature control heating belt 12. The temperature control heating belt 12 is wrapped on the barrel 11, two ends of the temperature control heating belt 12 are connected via a snap, this temperature control heating belt 12 is easy to carry and easy to install on site. The barrel 11 is provided with an adhesive sucking pipe 14, a first end of the adhesive sucking pipe 14 extends to a bottom of the barrel 11, and a second end of the adhesive sucking pipe 14 is connected with the outer joint 24 of the adhesive feeding joint. As the viscosity of the resin decreases with increase of the temperature, by using the temperature control stirring unit 1, a constant temperature can be determined for the resin for infiltration according to properties thereof, which may improve the infiltration effect and the infiltration efficiency.

The vacuum unit 3 includes a vacuum pump 31 and a buffer tank 32, the buffer tank 32 is communicated with the vacuum pump 31 through a connecting pipe and provided with a vacuum gauge 34 and an adhesive discharging pipe 35, an adhesive storage tank 33 is disposed in the buffer tank 32, the adhesive discharging pipe 35 is provided with a control valve 36 configured for throttling control, a first end of the adhesive discharging pipe 35 is located in the adhesive storage tank 33, and a second end of the adhesive discharging pipe 35 is communicated with the outer joint 24 of the adhesive discharging joint.

The reinforced fiber cloth 22 includes glass fiber cloth, carbon fiber cloth, aramid fiber cloth, basalt fiber cloth, boron fiber, polyester fiber, nylon fiber, polypropylene fiber, and polyimide fiber, etc. The flow-guiding net 23 has a surface density in a range of 60 g/m² to 400 g/m² and rhombic meshes, thereby ensuring uniform infiltration and good infiltration effect. The vacuum bag film 28 has a water vapor transmission of less than or equal to 0.006 g/m·24 h (40° C.·90% RH), an oxygen permeability of less than or equal to 0.024 ml/(m·24 h.·0.1 mPa), a binding strength of greater than 15 N/15 mm, an edge strength of greater than 20 N/15 mm, and a puncture strength of greater than 24 pounds. The water vapor transmission and the oxygen permeability are to prevent the reinforced fiber cloth 22 sealed in the vacuum bag film 28 from being affected by environmental moisture, so as to improve a binding capacity of the resin with the reinforced fiber. The edge strength, the binding strength and the puncture strength are to prevent air leakage during transportation, storage and infiltration of the vacuum bag film 28 to avoid failure of the infiltration.

Embodiments of the present disclosure provide a method for preparation of a composite for on-site pipeline reinforcement, including:

a. performing apparatus inspection, and connecting a temperature control stirring unit 1, an infiltration unit 2 and a vacuum unit 3 as required, in which glass fiber gridding cloth, carbon fiber cloth, and unidirectional glass fiber cloth are used as the reinforced fiber cloth 22 and tested respectively;

b. adding a suitable amount of resin for infiltration into the temperature control stirring unit 1 so that a mass ratio of the resin for infiltration to the glass fiber gridding cloth is 45:55; a mass ratio of the resin for infiltration to the carbon fiber cloth is 42:58; or a mass ratio of the resin for infiltration to the glass fiber gridding cloth is 45:55, setting a suitable stirring temperature and stirring speed, and a stirring time of 2 minutes;

c. activating the vacuum unit 3 to a vacuum degree of 0.08 MPa to create a negative pressure of 0.08 MPa in a reinforced fiber cloth wrap, air in a reinforced fiber cloth roll being sucked out and replaced by the resin which is configured to bind with the reinforced fiber so as to increase integrity of an end product, accurately calculating an amount of a resin adhesive used for the reinforced fiber, and precisely controlling performance and quality of the end product;

d. continuously running the vacuum unit 3 for more than 2 minutes after the resin for infiltration is sucked into the buffer tank 32 so as to suck the excess resin adhesive out, and stopping the vacuum unit 3;

e. an infiltration process, in which the resin after mixed is fed via an adhesive feeding joint, passes through a flow-leading net 26, flows into the reinforced fiber cloth roll via a periphery and through-holes 8 of a baffle 27, and is sucked out through an adhesive discharging joint;

f. disconnecting the infiltration unit from the vacuum unit 3 and the temperature control stirring unit 1, respectively, and taking out the reinforced fiber cloth roll;

g. wrapping a pipeline with the reinforced fiber cloth roll in a circumferential direction of the pipeline under a uniform tensile force, and performing a defoaming treatment simultaneously until completion of the wrapping to make the composite integrated.

The method of the present disclosure as described above was compared with the wet wrap process under a stirring temperature of 25° C. in the related art, the results is shown below.

|  | wet wrap process | | | Inventive examples | | |
| --- | --- | --- | --- | --- | --- | --- |
|  | glass fiber gridding cloth | unidirectional glass fiber cloth | carbon fiber cloth | glass fiber gridding cloth | unidirectional glass fiber cloth | carbon fiber cloth |
| tensile strength (MPa) | 312 | 561 | 1023 | 469 | 893 | 1564 |
| elasticity modulus (GPa) | 13.2 | 18.1 | 52 | 19.5 | 23.1 | 66.1 |
| bending strength (MPa) | 423 | 547 | 520 | 551 | 660 | 771 |
| interlaminar shear strength (MPa) | 26 | 21 | 26 | 39 | 29 | 42 |
| resin content (%) | 55.1 | 52.7 | — | 45.6 | 42.1 | — |

It can be seen that, with the method of the present disclosure, the tensile strength, the elastic modulus, the bending strength and the interlaminar shear strength all are improved significantly, and the resin content is reduced.

The device and method for preparation of a composite for on-site pipeline reinforcement according to embodiments of the present disclosure are described in detail above. Although the principle and implementation of the present disclosure are illustrated with reference to explanatory embodiments, these embodiments are only used to help understand the present disclosure and its spirit, and it will be appreciated by an ordinary person skilled in the art that changes and modifications can be made in the embodiments and application range without departing from spirit and scope of the present disclosure as defined in the claims. In summary, the content of this specification cannot be construed to limit the present disclosure.

What is claimed is:

1. A device for preparation of a composite for on-site pipeline reinforcement, comprising:
   a temperature control stirring unit, an infiltration unit, and a vacuum unit;
   wherein the temperature control stirring unit, the infiltration unit and the vacuum unit are connected and configured to allow the vacuum unit to draw an adhesive from the temperature control stirring unit into the infiltration unit;

wherein the infiltration unit comprises a spindle, reinforced fiber cloth, a flow-guiding net, and a vacuum bag film, wherein the reinforced fiber cloth and the flow-guiding net are wound on the spindle and the vacuum bag film is sleeved outside the spindle, the reinforced fiber cloth and the flow-guiding net;

wherein the spindle is stopped by two baffles, each baffle positioned on one of two opposing ends of the spindle, wherein the reinforced fiber cloth and the flow-guiding net are arranged between the two baffles, and each baffle is recessed to form an adhesive storing compartment, the adhesive storage compartment being positioned at an inner side of each baffle, the inner side being the side facing the spindle;

wherein the adhesive storing compartment defines a plurality of through-holes for feeding or discharging the adhesive;

wherein an adhesive feeding joint and an adhesive discharging joint are disposed at each of the two opposing ends of the spindle, respectively, and each of the adhesive feeding joint and the adhesive discharging joint comprises an inner joint and an outer joint with sealing discs disposed at a junction between the inner joint and the outer joint;

wherein each inner joint is threadedly connected with each outer joint, and each inner joint defines a plurality of openings for feeding or discharging the adhesive;

wherein an outer wall of each inner joint and an outer side of each baffle are each covered by a flow-leading net, and each flow-leading net extends from an edge of each respective baffle into the adhesive storing compartment of each baffle; and the flow-guiding net and each flow-leading net are configured to allow infiltration of the adhesive.

2. The device according to claim 1, wherein the reinforced fiber cloth and the flow-guiding net are layered and alternately wound on the spindle.

3. The device according to claim 1, wherein an O-ring is disposed between the sealing discs of each of the adhesive feeding joint and the adhesive discharging joint, respectively, and wherein two ends of the vacuum bag film are located in the sealing discs of the adhesive feeding joint and the sealing discs of the adhesive discharging joint, respectively, and are tightened and sealed via threaded structures of each inner joint and outer joint.

4. The device according to claim 3, wherein each O-ring is fitted into one or more annular grooves defined in the sealing discs of the adhesive feeding joint and the adhesive discharging joint.

5. The device according to claim 1, wherein the two baffles are detachably connected with the spindle, and a distance between the two baffles is adjustable.

6. The device according to claim 1, wherein the temperature control stirring unit comprises a barrel, a cover plate, a stirrer fixed to the cover plate, and a temperature control heating belt wrapped on the barrel, wherein two ends of the temperature control heating belt are connected via a snap, the barrel is provided with an adhesive sucking pipe, a first end of the adhesive sucking pipe extends to a bottom of the barrel, and a second end of the adhesive sucking pipe is connected with the outer joint of the adhesive feeding joint.

7. The device according to claim 1, wherein the vacuum unit comprises a vacuum pump and a buffer tank connected with the vacuum pump through a connecting pipe and provided with a vacuum gauge and an adhesive discharging pipe, wherein an adhesive storage tank is disposed in the buffer tank, the adhesive discharging pipe is provided with a control valve, a first end of the adhesive discharging pipe is located in the adhesive storage tank, and a second end of the adhesive discharging pipe is connected with the outer joint of the adhesive discharging joint.

8. The device according to claim 1, wherein the reinforced fiber cloth is selected from the group consisting of glass fiber cloth, carbon fiber cloth, aramid fiber cloth, basalt fiber cloth, boron fiber, polyester fiber, nylon fiber, polypropylene fiber, and polyimide fiber.

9. The device according to claim 1, wherein each flow-guiding net has a surface density in a range of 60 $g/m^2$ to 400 $g/m^2$ and rhombic meshes.

10. The device according to claim 1, wherein the vacuum bag film has a water vapor transmission of less than or equal to 0.006 g/m·24 h (40° C.·90% RH).

11. The device according to claim 1, wherein the vacuum bag film has an oxygen permeability of less than or equal to 0.024 ml/(m·24 h.·0.1 mPa).

12. The device according to claim 1, wherein the vacuum bag film has a binding strength of greater than 15 N/15 mm.

13. The device according to claim 1, wherein the vacuum bag film has an edge strength of greater than 20 N/15 mm, and a puncture strength of greater than 24 pounds.

* * * * *